United States Patent [19]
Onstott et al.

[11] 4,283,877
[45] Aug. 18, 1981

[54] WEEDLESS- MULTI-BARB FISHHOOK

[76] Inventors: Darrell C. Onstott; Velma L. Onstott, both of 2550 21st St., Gering, Nebr. 69341

[21] Appl. No.: 160,011

[22] Filed: Jun. 16, 1980

[51] Int. Cl.$^3$ ............................................. A01K 83/00
[52] U.S. Cl. .......................................... 43/34; 43/42.4; 43/43.2
[58] Field of Search ....................... 43/43.2, 43.4, 43.6, 43/42.4, 42.41, 42.1, 34

[56] References Cited

U.S. PATENT DOCUMENTS

| | | | |
|---|---|---|---|
| 679,296 | 7/1901 | Clark | 43/42.4 |
| 699,711 | 5/1902 | Pyott | 43/42.4 |
| 1,069,093 | 7/1913 | Faught | 43/43.2 |
| 2,124,263 | 7/1938 | Schott | 43/43.2 |
| 2,392,677 | 1/1946 | Lauby | 43/42.4 |
| 3,331,151 | 7/1967 | Turrentine | 43/43.2 |

*Primary Examiner*—Stephen G. Kunin
*Assistant Examiner*—J. T. Zatarga

*Attorney, Agent, or Firm*—Harvey B. Jacobson

[57] ABSTRACT

A head structure is provided defining a hollow cavity opening outwardly of one side of the head and the head includes line anchor structure thereon for attaching one end of a fishing line to the head structure. A pair of oppositely facing side-by-side self-shielding fishhooks are also provided including a pair of shanks yieldingly mounted at one pair of corresponding base ends within the cavity in laterally spaced generally parallel relation for movement of the other pair of ends of the shanks toward and away from each other. The other pair of shank ends include oppositely curved hook portions opening toward the first mentioned shank ends and the latter are telescoped within the cavity of the head structure and closely oppose opposite sides of the cavity. A resilient body is disposed within the cavity between portions of the shanks spaced slightly from the base ends thereof and yieldingly biases those shank portions away from each other.

7 Claims, 4 Drawing Figures

U.S. Patent      Aug. 18, 1981      4,283,877
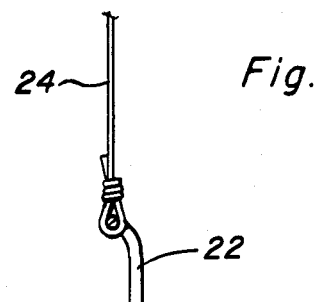
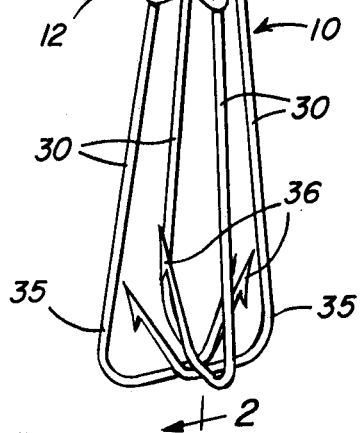
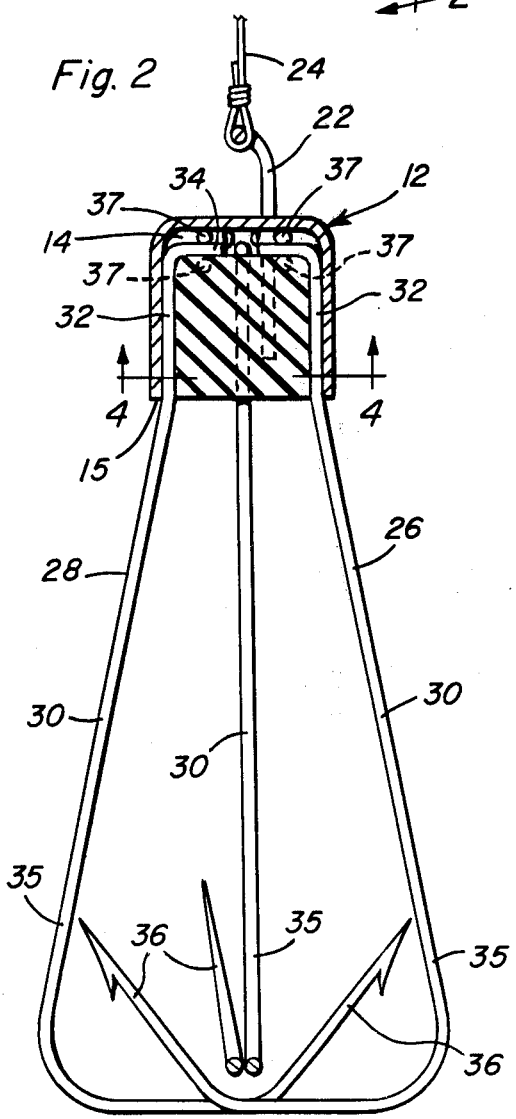
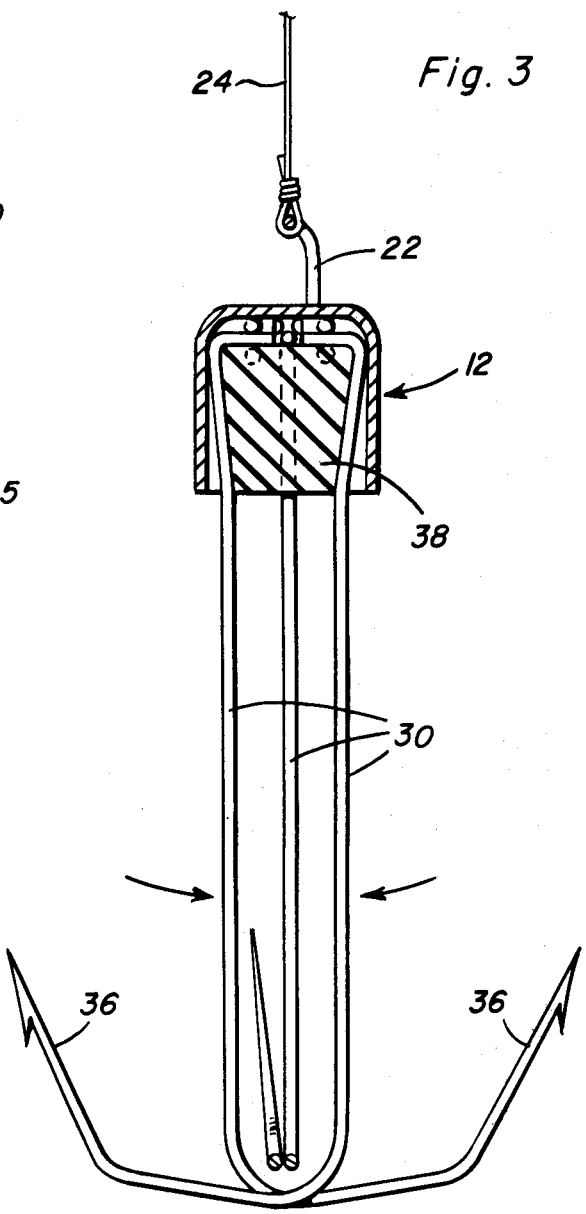
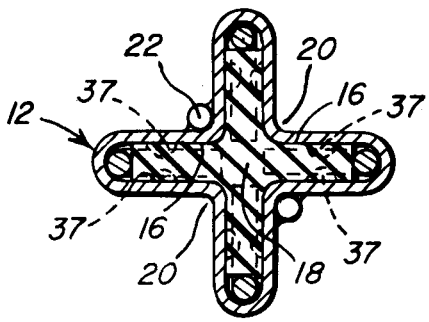

WEEDLESS-MULTI-BARB FISHHOOK

BACKGROUND OF THE INVENTION

Various forms of weedless multi-barb fishhooks heretofore have been provided and some of these weedless fish hooks include pairs of oppositely facing fishhook members which each enclose the barbed hook end of the other. The hook members are supported relative to each other in a yieldable manner and with the ends of the shanks supporting the hooks therefrom in slightly divergent relation. When a fish strikes, the hook supporting ends of the shanks are biased toward each other by the fish and each of the barbed hooks carried by the shank free ends are thus fully exposed.

Examples of previously known fishhooks of this type as well as other types including some of the general structural and operational features of the instant invention are disclosed in U.S. Pat. Nos. 454,508, 679,296, 2,124,263 and 3,727,340. However, these previously known fishhooks are not operative, as a result of light strikes thereon, to fully extend the barbed points of the hooks thereof. Accordingly, a need exists for an improved form of weedless multi-barb hook of the self-shielding type.

SUMMARY OF THE INVENTION

The fishhook of the instant invention includes at least one pair of oppositely facing and relatively yieldably supported as well as self-shielding fishhooks together forming a fishhook structure of the weedless type with retracted barbed hook ends, but which functions, upon being the subject of a fish strike, to uncover the barbed hook portions thereof in a manner substantially insuring proper hooking of the striking fish.

The main object of this invention is to provide a multi-barb weedless fishhook.

Another object of this invention is to provide a multi-barb fishhook of the shielded type but which is constructed in a manner to automatically unshield and thus expose the barbed hook portions thereof as a result of a fish strike thereon.

A further important object of this invention is to provide a fishhook construction which may be utilized primarily as a hook construction to be baited, but which may also be incorporated in the manufacture of artificial lures.

Yet another object of this invention is to provide a fishhook construction which may be readily manufactured in different sizes.

A further object of this invention is to provide a fishhook construction which may be utilized not only for still fishing, but also for trolling operations.

A final object of this invention to be specifically enumerated herein is to provide a fishhook construction in accordance with the preceding objects and which will conform to conventional forms of manufacture, be of simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a fishhook constructed in accordance with the present invention;

FIG. 2 is an enlarged fragmentary vertical sectional view taken substantially upon the plane indicated by the section line 2—2 of FIG. 1 and illustrating the fishhook members in self-shielding relation;

FIG. 3 is a vertical sectional view similar to FIG. 2 but illustrating the fishhook members in unshielded relation to expose the barded hook ends thereof; and FIG. 4 is a horizontal sectional view taken substantially upon the plane indicated by the section line 4—4 of FIG. 2.

DETAILED DESCRIPTION OF THE INVENTION

Referring now more specifically to the drawings, the numeral 10 generally designates the fishhook of the instant invention. The hook 10 includes a hollow head structure 12 defining a cavity 14 therein opening outwardly of one side 15 of the head structure 12.

The head structure 12 is substantially cruciform in transverse cross-sectional shape and thus defines four hollow arm areas 16 which open inwardly into a central area 18. The wall thickness of the head structure 12 is substantially equal throughout and thus the head structure 12 defines four circumferentially spaced and outwardly opening outer inside corners 20, see FIG. 4. A U-shaped bail 22 has the free ends of the legs thereof secured in remote corners 20 of the head structure 12 and defines an anchor to which the free end portion 24 of a fishing line may be secured in any suitable manner.

The hook structure 12 includes two pairs of hook members 26 and 28 and each hook member 26 and 28 includes an elongated shank 30 having a first pair of generally parallel base end portions 32 disposed in spaced apart relation and including angulated terminal ends 34. The shanks 30 include corresponding second free end portions 35 which are slightly divergent and include oppositely curved barbed hooks 36 thereon. The pairs of hook members 26 and 28 are telescoped within the cavity 14 in a manner believed to be evident from FIGS. 1 and 2 of the drawings with the end portions 32 seated within the closed outer ends of the arm areas 16. The terminal ends 34 are anchored within the cavity 14 by inwardly displaced dimples 37 on the head structure 12.

A resilient body 38 which is substantially cruciform in cross-sectional shape is received within the cavity 14 and the arms of the cruciform body 38 are disposed within the arm areas 16 inwardly of the end portions 32 and engage the inner sides thereof to yieldingly resist inward swinging movement of those portions of the end portions 32 adjacent the end portions 35.

It may be seen from FIG. 2 of the drawings that the end portions 32 abut against the inner surfaces of the closed outer ends of the arm areas 16 and thus maintain each hook 36 shielded by the end portion 34 of the opposing hook member. Thus, the fishhook 10 is substantially weedless. However, when a fish strikes at the hook 10, the action of the fish striking at the hook 10 causes the end portions 35 to swing toward each other and to thus fully expose the hooks 36 in the manner illustrated in FIG. 3 of the drawings. As the end portions 35 are displaced toward each other as a result of a fish striking at the hook 10, the rod material of which the hook members 26 and 28 is constructed bends at the juncture between the bight portions 34 and the end portions 32. Thus, the resilient body 38 yieldingly resists movement of the hook members 26 and 28 from the shielded positions thereof illustrated in FIG. 2 to the unshielded positions thereof illustrated in FIG. 3.

The fishhooks 10 may be constructed in miniature for use as multiple hooks to be attached to plugs and other forms of artificial lures, the fish hook 10 may also be constructed in larger sizes and have conventional artificial lure materials attached thereto and the fishhook 10 may also be incorporated in the construction of a trolling lure as well as baited for use in still fishing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A weedless multi-barb fishhook including a head structure, defining a hollow cavity including an open side opening outwardly of one side of the head structure, said head structure including line anchor means thereon for attaching one end of a fishing line to said head structure, a pair of oppositely facing fishhooks including a pair of shanks yieldingly supported at one pair of corresponding base end portions thereof within said cavity in laterally spaced apart relation and for swinging movement of the other pair of corresponding end portions thereof toward and away from each other, said other pair of corresponding end portions including oppositely curved hook portions opening toward said one pair of one end portions, said one pair of end portions being telescoped within said cavity in position closely opposing opposite sides of said cavity, and a resilient body disposed within said cavity between said one pair of base end portions of said shanks and yieldingly resisting movement of said base end portions toward each other, said base end portions including angulated terminal ends anchored in said cavity and projecting toward each other, said cavity defining narrow portions thereof in which said base end portions and said terminal ends are received with said base end portions swingable through said narrow portions toward and away from each other, said cavity including inwardly projecting portions spaced toward said open side of said cavity from said terminal ends preventing withdrawal of the latter and thus said fishhooks from said cavity.

2. The combination of claim 1 including a second pair of oppositely facing fishhooks including similar yieldingly supported shank base end portions and oppositely curved hooked portions on their ends remote from their base end portions, the base end portions of the shanks of the second pair of hooks also being telescoped within said cavity with said resilient body also disposed between the base end portions of the shanks of the second pair of fishhooks, said first and second pairs of fishhooks being disposed in relatively angulated planes generally paralleling the direction in which said cavity opens.

3. The combination of claim 1 including a second pair of oppositely facing fishhooks including similar yieldingly supported shank base end portions and carrying oppositely curved hooked portions on the ends of the shanks remote from their base end portions, the base end portions of said second pair of hooks also being telescoped within said cavity with said resilient body also disposed between the base end portions of the shanks of the second pair of fishhooks, said first and second pairs of fishhooks being disposed in relatively angulated planes generally paralleling the direction in which said cavity opens, said base ends of the second pair of hooks also including angulated terminal ends projecting toward each other.

4. The combination of claim 3 wherein said cavity is cruciform in cross-sectional shape with each of said shank portions disposed in one of the four arm portions defining the narrow portions of said cavity.

5. The combination of claim 4 wherein said resilient body is also cruciform in cross-sectional shape and substantially fills said cavity inwardly of said base end portions of said shanks.

6. The combination of claim 5 wherein each of said shanks is generally rod-like in form and said angulated terminal ends also comprise rod-like members.

7. The combination of claim 4 wherein said head structure is also cruciform in cross-sectional shape and defines four peripherally spaced outwardly opening outer inside corners, said line anchor means including a U-shaped bail including generally parallel legs interconnected by a bight portion extending between one pair of ends of said legs, the other pair of ends of said legs being seated and secured in diagonally opposite outwardly opening outer inside corners of said head structure.

* * * * *